United States Patent

Kim et al.

Patent Number: 6,064,445
Date of Patent: May 16, 2000

[54] AUTOMATIC PICTURE SIZE CONTROL METHOD FOR SEMIWIDE-SCREEN TELEVISION RECEIVER

[75] Inventors: Dong-Gyun Kim; Sang-Won Suh, both of Suwon, Rep. of Korea

[73] Assignee: Samsung Electronics Co., Ltd., Rep. of Korea

[21] Appl. No.: 08/979,120

[22] Filed: Nov. 26, 1997

[30] Foreign Application Priority Data

Nov. 28, 1996 [KR] Rep. of Korea ............... 96-58903
Dec. 31, 1996 [KR] Rep. of Korea ............... 96-79852

[51] Int. Cl.[7] .................. H04N 9/74; H04N 5/46
[52] U.S. Cl. ................................ 348/581; 348/556
[58] Field of Search ...................... 348/581, 445, 348/556, 704, 558, 604, 913

[56] References Cited

U.S. PATENT DOCUMENTS

| | | | |
|---|---|---|---|
| 4,730,215 | 3/1988 | Jose et al. | 358/140 |
| 5,355,409 | 10/1994 | Hirashima | 380/14 |
| 5,486,871 | 1/1996 | Filliman et al. | 348/558 |
| 5,537,149 | 7/1996 | Teraoka et al. | 348/556 |
| 5,581,304 | 12/1996 | Wang | 348/558 |
| 5,614,956 | 3/1997 | Matsuura . | |
| 5,699,123 | 12/1997 | Ebihara et al. | 348/445 |
| 5,760,837 | 6/1998 | Izawa et al. | 348/455 |
| 5,801,776 | 9/1998 | Tamura et al. | 348/403 |

OTHER PUBLICATIONS

British Patent Office Search Report, dated Mar. 23, 1998.

*Primary Examiner*—Andrew I. Faile
*Assistant Examiner*—Uyen Le
*Attorney, Agent, or Firm*—Dilworth & Barrese

[57] ABSTRACT

An automatic picture size control method for a semiwide-screen television receiver. According to the method, levels of left and right edge portions in all active period of one horizontal scanning line of a received television signal are sampled, and how many times a sampled level becomes a black level for a predetermined time is detected and counted. Thereafter, a size of a displayed picture is designated as a plus picture size or a normal picture if a counted value is larger than a predetermined first value, or smaller than a predetermined second value, respectively.

20 Claims, 7 Drawing Sheets

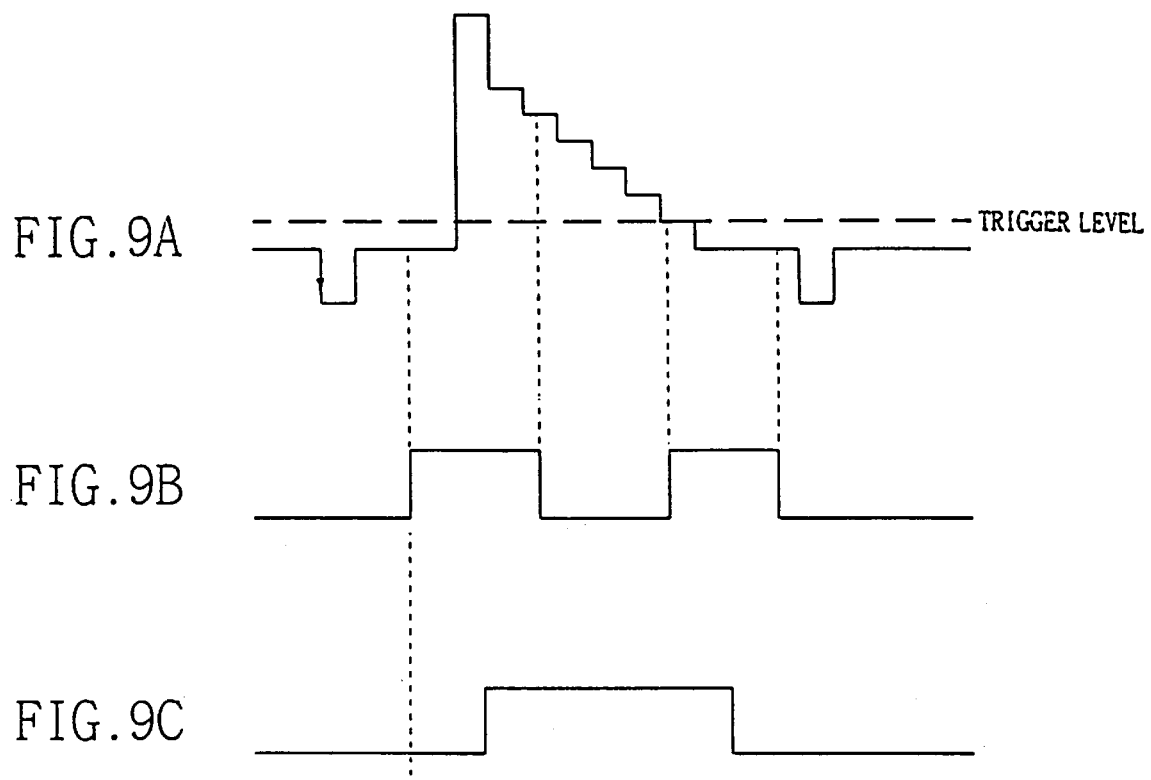
FIG.9A
FIG.9B
FIG.9C
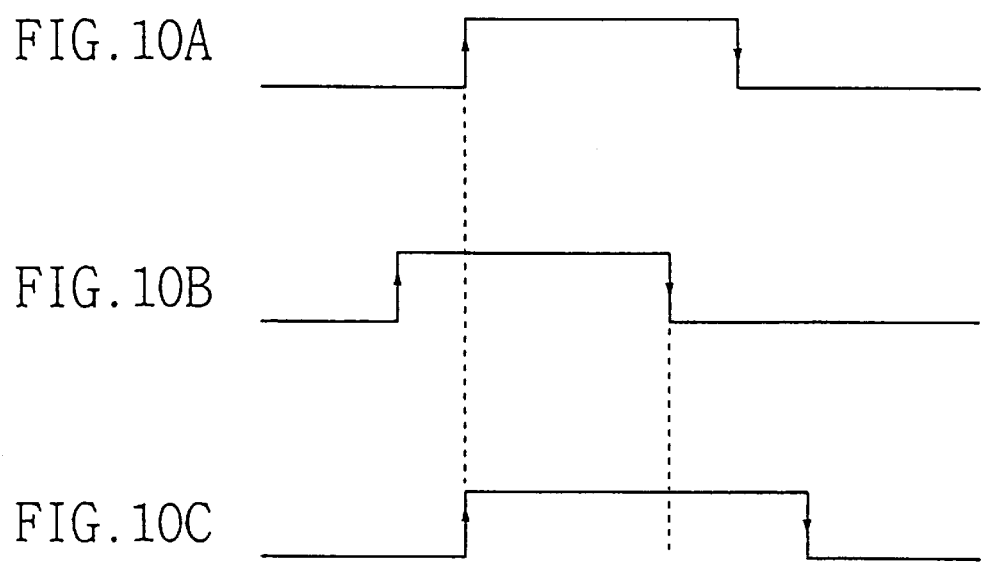
FIG.10A
FIG.10B
FIG.10C

AUTOMATIC PICTURE SIZE CONTROL METHOD FOR SEMIWIDE-SCREEN TELEVISION RECEIVER

BACKGROUND OF THE INVENTION

1. Field of the Invention

The present invention relates to an automatic picture size control method which can automatically control the picture size in a semiwide-screen television receiver wherein the horizontal effective picture size can be widened and thus right and left corner portions of the picture, which are invisible due to overscanning, can be viewed on a display screen, providing a horizontally extended picture on the screen.

Also, the present invention relates to an apparatus for detecting inmost boundaries of right and left edge portions of the screen where the image signal is displayed.

2. Description of the Prior Art

Generally, television broadcasting stations transmit video signals having a 12×9 or a 4×3 aspect ratio (AR). Referring to FIG. 1, the overall number of scanning lines in the NTSC system is 525, while the number of scanning lines for the effective image (i.e., overall scanning lines—scanning lines for the vertical blanking periods: 525H−2=20H=485H, where 1H is a period for a scanning line) is 485. Also, the effective horizontal scanning period is determined by subtracting the horizontal blanking period from one scanning period (1H) (63.5 $\mu$s−10.9 $\mu$s=52.6 $\mu$s).

However, in a typical television receiver of the NTSC standard, 100% of an image signal is not displayed on the screen of a cathode ray tube (CRT).

FIG. 2 illustrates test patterns shown on the screen for testing the image received in a television receiver. FIG. 3 illustrates a test pattern shown on the screen for testing an overscanning among the test patterns of FIG. 2.

In a typical NTSC type television receiver, an overscanning of about 9.4% in vertical and horizontal directions is performed, and thus the vertical and horizontal edge portions of 9.4% of the 4×3 AR image signal transmitted from the broadcasting station cannot be viewed. The reason why such an overscanning is performed in a television receiver is to prevent a distorted image from being displayed on the edge portions of the screen due to an unstable deflection, unstable focusing, unstable high voltage, etc. of the CRT. Specifically, the inductance dispersion in a deflection unit causes the instability of the image displayed on the edge portions of the screen. That is, if the inductance of the horizontal deflection coil is large in comparison with a normal value, the corresponding impedance is increased and horizontal deflection current is decreased, causing the horizontal width of the image to become smaller and thus causing a part of the blanking interval to be viewed on the right and left edge portions of the screen. On the contrary, if the inductance is small, the corresponding impedance is decreased and horizontal deflection current is increased, causing the horizontal width of the image to become larger and thus causing picture information being concealed at the edges of the screen to be increased.

In order to satisfy the limited conditions of the television receiver as described above and to display a stable image on the screen, the overscanning of 9.4% in vertical and horizontal directions has been adopted by manufacturers of television receivers since 1960 when the television receivers were in commercial use.

Recently, a wide-vision television receiver which displays a video signal having a 12×9 AR on a screen having a 16×9 AR has been introduced. According to this wide-vision, the scanning lines are not changed, but the image displayed on the screen is horizontally expanded by about 1.33 times. Meanwhile, techniques for receiving a 16×9 AR video signal transmitted from a broadcasting station and displaying the received 16×9 AR video signal on a display screen of a 4×3 AR or of a 16×9 AR have been introduced. For instance, U.S. Pat. No. 5,386,236 discloses such a technique.

However, according to the wide-vision television receiver, the image displayed on the 16×9 AR screen is distorted since the image signal having the 4×3 AR is merely expanded in a horizontal direction. Further, since the image is compressed in the vertical or horizontal direction, black panels are shown on the top and bottom portions, or the right and left edge portions of the screen, deteriorating the availability of the screen.

In order to solve the problems involved in the prior art, the inventor filed a United States patent application for the invention entitled "A semiwide-screen television receiver" which can provide a horizontally extended image on the screen without image distortion by reducing the rate of overscanning in a horizontal direction by increasing the horizontal picture size of a screen of a cathode ray tube.

In such a semiwide-screen television receiver, a 12.8×9 AR semiwide picture or 12×9 AR normal picture is selectively displayed in response to an input picture size signal. When selecting the semiwide picture, i.e., a so-called plus picture, a strict adjustment of the picture size is required. However, if the television signal is pushed or pulled during its transmission, propagation, or reception, the horizontal blanking intervals may appear on the left and right corners of the screen. Also, for the semiwide screen case, the detection of the left and right boundaries of the picture is used for optimally displaying the image signal as wide as possible in both left and right directions, while in the normal picture case it is used for detecting the optimum boundaries of the left and right edge portions.

For to a normal television broadcasting signal, the left and right boundaries of the received image signal are cut with a sufficient margin, and thus the image signal is uniformly displayed on a 4×3 AR screen, causing the data at the left and right sides of the received image signal to be lost. Accordingly, in order to solve this problem, a technique has recently been developed, whereby the image signal is displayed on the 12.8×9 AR screen by detecting the left and right boundaries where the image signal exists, without uniformly cutting the left and right boundaries of the image signal.

Referring to FIG. 4, a conventional technique for detecting the left and right boundaries of the image signal is explained.

In order to detect the left and right boundaries of the image signal, five check points are determined on each of 37th and 230th horizontal scanning lines, respectively. At the respective check points, it is checked whether or not the luminance signal level of the image signal is higher than a predetermined value, and the checked values are accumulated for 600 fields.

Specifically, if the luminance signal value of the image signal is higher than the predetermined value at each check point, "+1" is accumulated, while if not, "−1" is accumulated. For instance, if the luminance signal having a level over the predetermined level is inputted for 600 fields at the check point 1, the accumulated value will be "+1200" since the check is performed twice per field. The accumulated value for 600 fields at each check point will be in the range of −1200 ~+1200.

The accumulated value in the range of −1200~+1200 is converted into a percentage in the range of 0~100%. If the accumulated percentage at each check point is low, it is determined that no significant image signal exists at the corresponding point, while if the accumulated percentage is high, it is determined that a significant image signal exists at the corresponding point.

Specifically, if the accumulated percentage at the first check point is less than 3% and that at the second check point is less than 40% (i.e., case 1), it is determined that no significant image signal exists at the first check point (which is the furthest choice for the left boundry of the image signal). If the accumulated percentage at the fifth check point is less than 3%, that at the fourth check point is more than 40%, and that at the third check point is more than 40% (i.e., case 2), it is determined that no significant image signal exists at the fifth check point (which is the furthest choice for the right boundary of the image signal). If the case 1 or case 2 is produced, the left and right boundaries of the image signal are defined at the second and fourth check points.

On the contrary, if the accumulated percentages at the first, second, third, fourth, and fifth check points are more than 40%, it is determined that significant image signals exist at the first and second check points, and the left and right boundaries of the image signal are defined at the first and fifth check points.

However, according to the conventional detecting technique, since the left and right boundaries of the entire picture are determined by checking only the 37th and 230th horizontal scanning lines for each field, an accurate boundary detection cannot be achieved with respect to the middle portion of the picture. Further, since the values accumulated for 600 fields at five check points are used to calculate a mean value per field, it is difficult to obtain an accurate boundary value.

SUMMARY OF THE INVENTION

It is an object of the present invention to solve the problems involved in the prior art, and to provide an automatic picture size control method for a semiwide-screen television receiver which can display a complete image signal by checking the received image signal.

It is another object of the present invention to provide an apparatus for detecting optimum left and right boundaries of an image signal by determining the left and right boundaries with respect to respective horizontal scanning lines of the image signal which corresponds to an entire picture, and detecting inmost boundary values.

In one aspect of the present invention, there is provided a method of controlling a picture size, comprising the steps of:

sampling levels of left and right edge portions in an active period of one horizontal scanning line of a received television signal;

detecting and counting how many times a sampled level is above a predefined level for a predetermined time;

designating a size of a displayed picture as a plus picture size if a counted value is larger than a predetermined first value; and designating the size of the displayed picture as a normal picture size if a counted value is smaller than a predetermined second value.

In another aspect of the present invention, there is provided an apparatus for detecting left and right boundaries of a picture which corresponds to a received image signal, the apparatus comprising:

a counter for being reset by a horizontal sync signal of the image signal, and receiving a clock signal;

a window signal generator for receiving the horizontal sync signal and the clock signal, and generating a window signal for a predetermined period of the horizontal sync signal;

a Schmitt trigger for generating a trigger signal in accordance with the image signal;

a first AND gate for AND-gating the window signal from the window signal generator and the trigger signal from the Schmitt trigger to detect a left boundary of one horizontal scanning line;

a second AND gate for AND-gating the window signal from the window signal generator and an inverted signal of the trigger signal from the Schmitt trigger to detect a right boundary of the horizontal scanning line;

a first comparator for comparing the counter output with a value of a previous image, upon receiving an enable signal output by the second AND gate, to detect a left boundary of an entire picture;

a second comparator for comparing the counter output with the value of the previous image, upon recieving an enable signal output by the second AND gate, to detect a right boundary of the entire picture;

a first latch for storing an output value of the first comparator, outputting the boundary value stored therein to the first comparator as the value of the previous image, and outputting the left boundary value of the entire picture; and a second latch for storing an output value of the second comparator, outputting the boundary value stored therein to the second comparator as the value of the previous image, and outputting the right boundary value of the entire picture.

BRIEF DESCRIPTION OF THE DRAWINGS

The above objects, other features and advantages of the present invention will become more apparent by describing preferred embodiments thereof with reference to the accompanying drawings, in which:

FIGS. 9A to 9C are waveform diagrams explaining the operation of the apparatus of FIG. 8.

FIGS. 10A to 10C are waveform diagrams explaining the signals indicating the left and right boundaries of the picture detected in respective horizontal scanning lines.

DETAILED DESCRIPTION OF PREFERRED EMBODIMENTS

Figure 1:
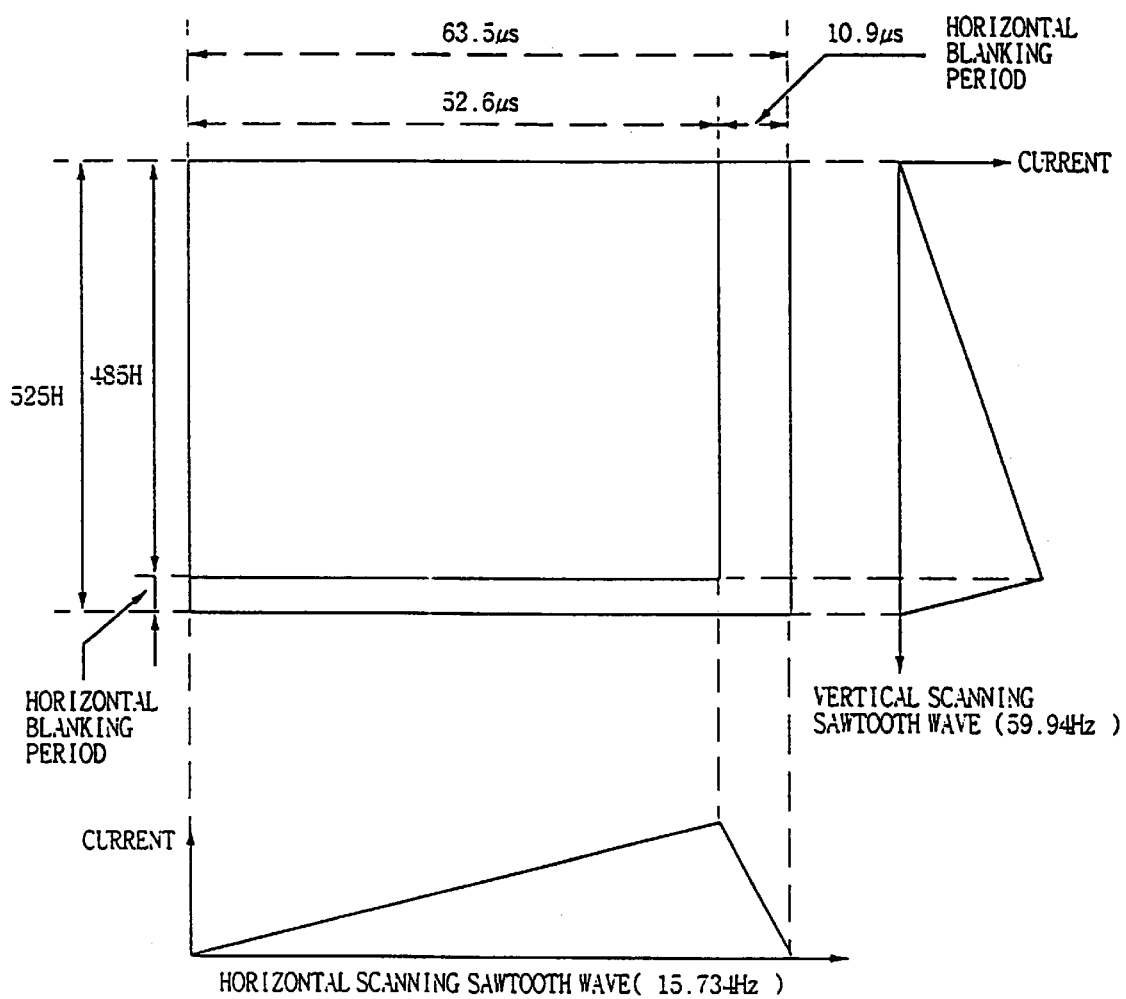
FIG. 1 is a view explaining a display screen of an NTSC type television receiver.
Figure 2:
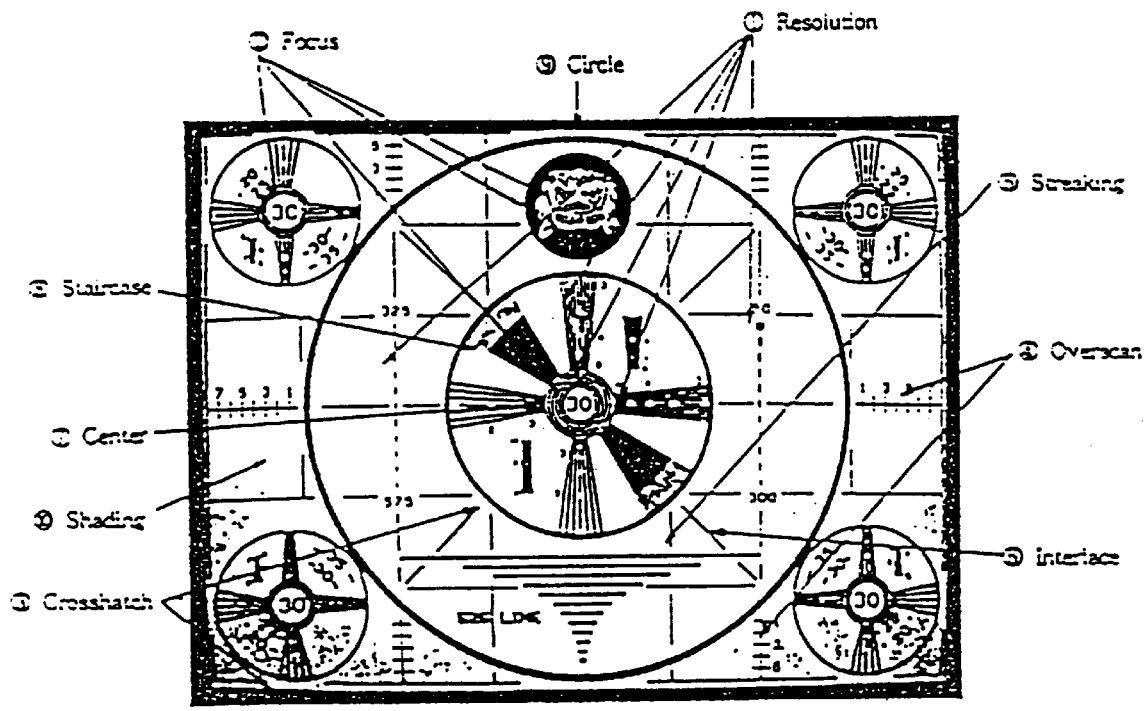
FIG. 2 is a view illustrating test patterns for the picture adjustment in an NTSC type television receiver.
Figure 3:
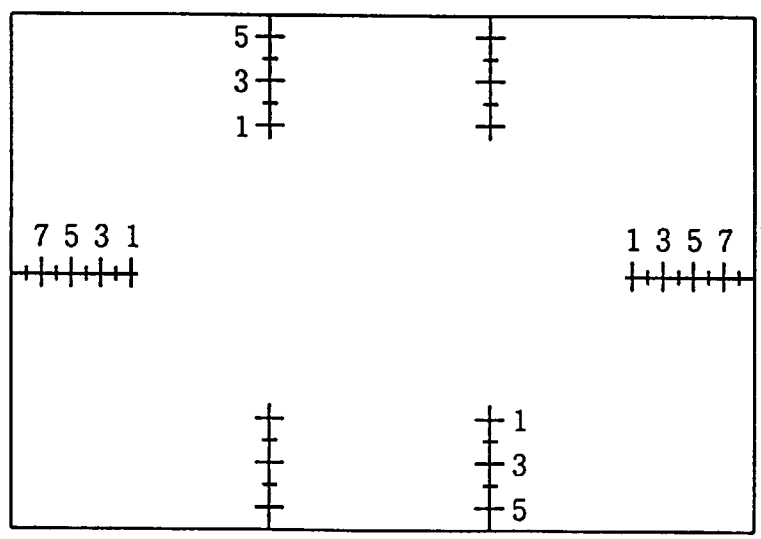
FIG. 3 is a view illustrating an overscanning test pattern among the test patterns of FIG.
Figure 4:
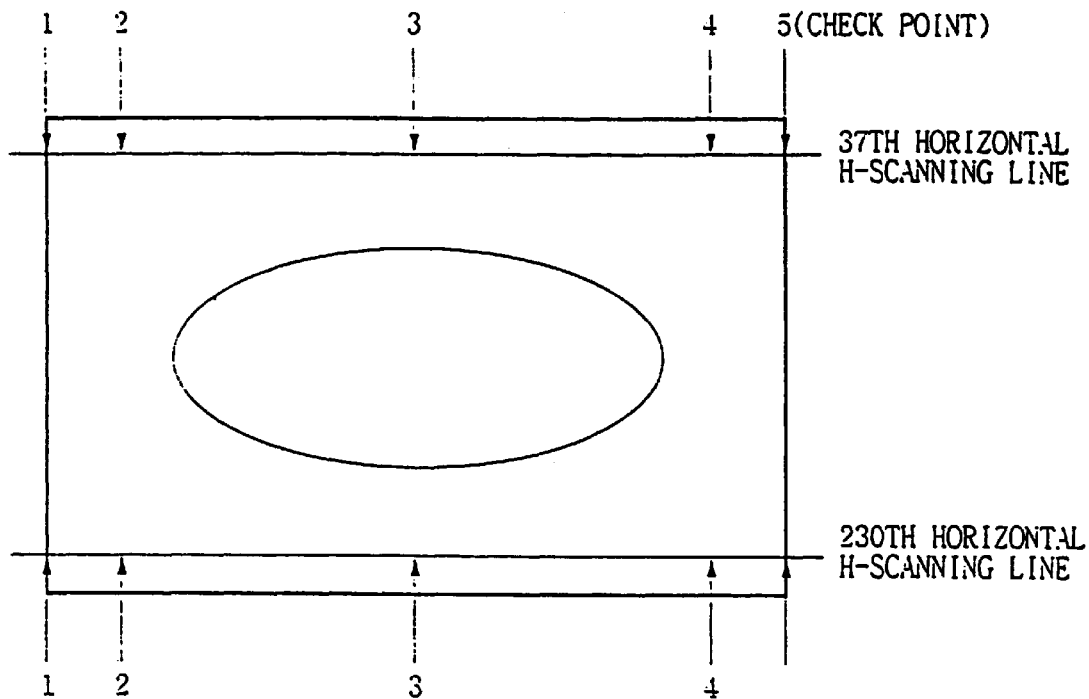
FIG. 4 is a view explaining a conventional method of detecting the left and right boundaries of the picture.
Figure 5:
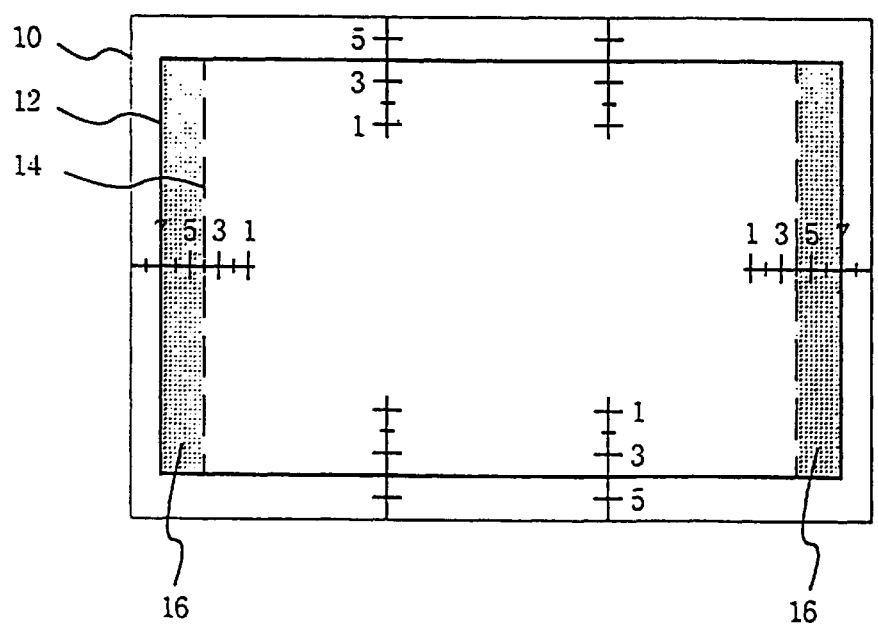
FIG. 5 is a view illustrating a CRT screen and an overscanning rate of a semiwide-screen television receiver according to the present invention.

FIG. 5 is a view illustrating a CRT screen and an overscanning rate of the semiwide-screen television receiver according to the present invention. In FIG. 5, the outer rectangle 10 shown as a thin solid line represents the picture size of a 12×9 AR transmitted from a broadcasting station, the middle rectangle 12 shown in a thick solid line represents the picture size of the CRT according to the present invention, and the inner rectangle 14 shown as a dotted line represents the picture size of a 4×3 AR according to the conventional CRT. As illustrated, the horizontal width of the CRT according to the present invention is larger than that of the CRT having a 4×3 AR shown as a dotted line. Thus, the rate of overscanning is reduced from 9.4% to 3.2%, and more information as much as the shaded portions 16, can be viewed on the display screen.

Figure 6:
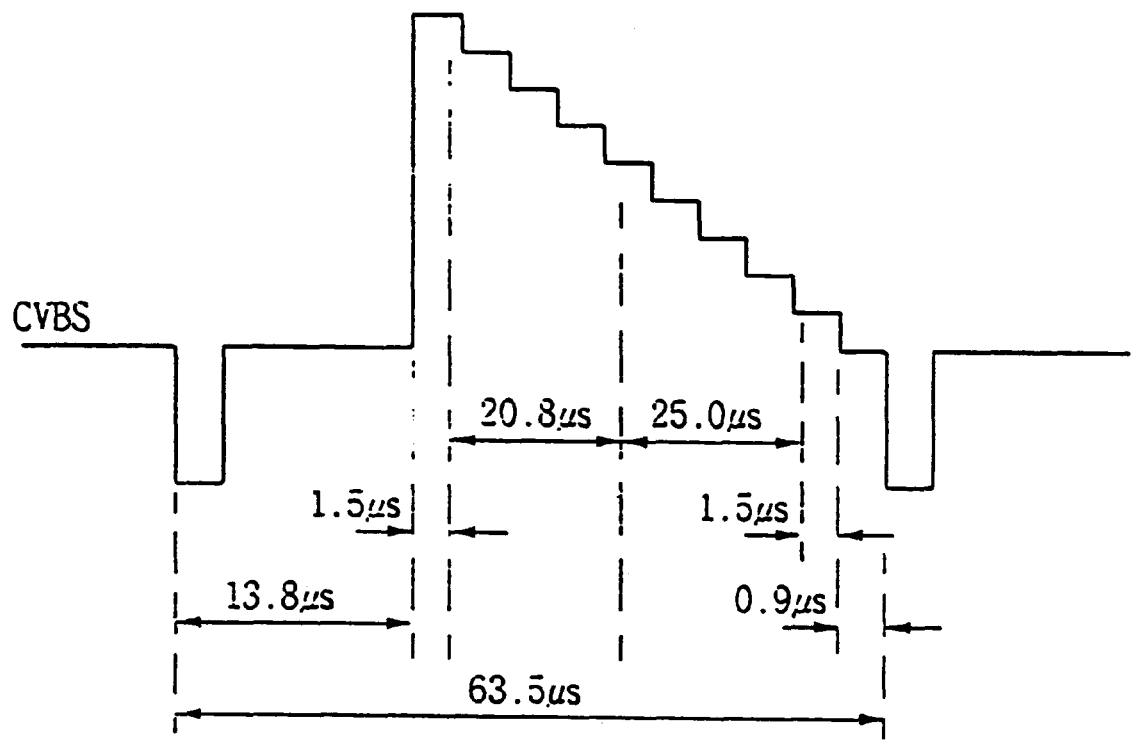
FIG. 6 is a view explaining the principle of the picture state detection in accordance with the present invention.

According to the present invention, as shown in FIG. 6, the push or pull of the received video signal is detected by detecting the level of the left and right edge portions of the video signal in an active period of one horizontal scanning line. Referring to FIG. 6, the detecting points are the center C of the active period, the left detecting point L which is 1.5 $\mu$s away from the left edge, and the right detecting point R which is 1.5 $\mu$s away from the right edge.

Accordingly, the maximum value is calculated by maximum value (MAX)=3(the number of detecting points)×2(the number of horizontal scanning lines per frame)×30(the number of frames per second)×2 (detecting time/second).

As described above, the method of controlling a picture size according to the present invention comprises the steps of A) sampling levels of left and right edge portions in an active period of one horizontal period of a received television signal; B) detecting and counting how many times a sampled level becomes a black level for a predetermined time; C) designating a size of a displayed picture as a plus picture size if a counted value is larger than a predetermined first value; and D) designating the size of the displayed picture as a normal picture size if a counted value is smaller than a predetermined second value.

Briefly, the first value is $\frac{2}{3}$ of the maximum value, and the second value is $\frac{1}{3}$ of the maximum value. The sampled horizontal scanning lines are 23rd and 230th horizontal scanning lines.

Figure 7:
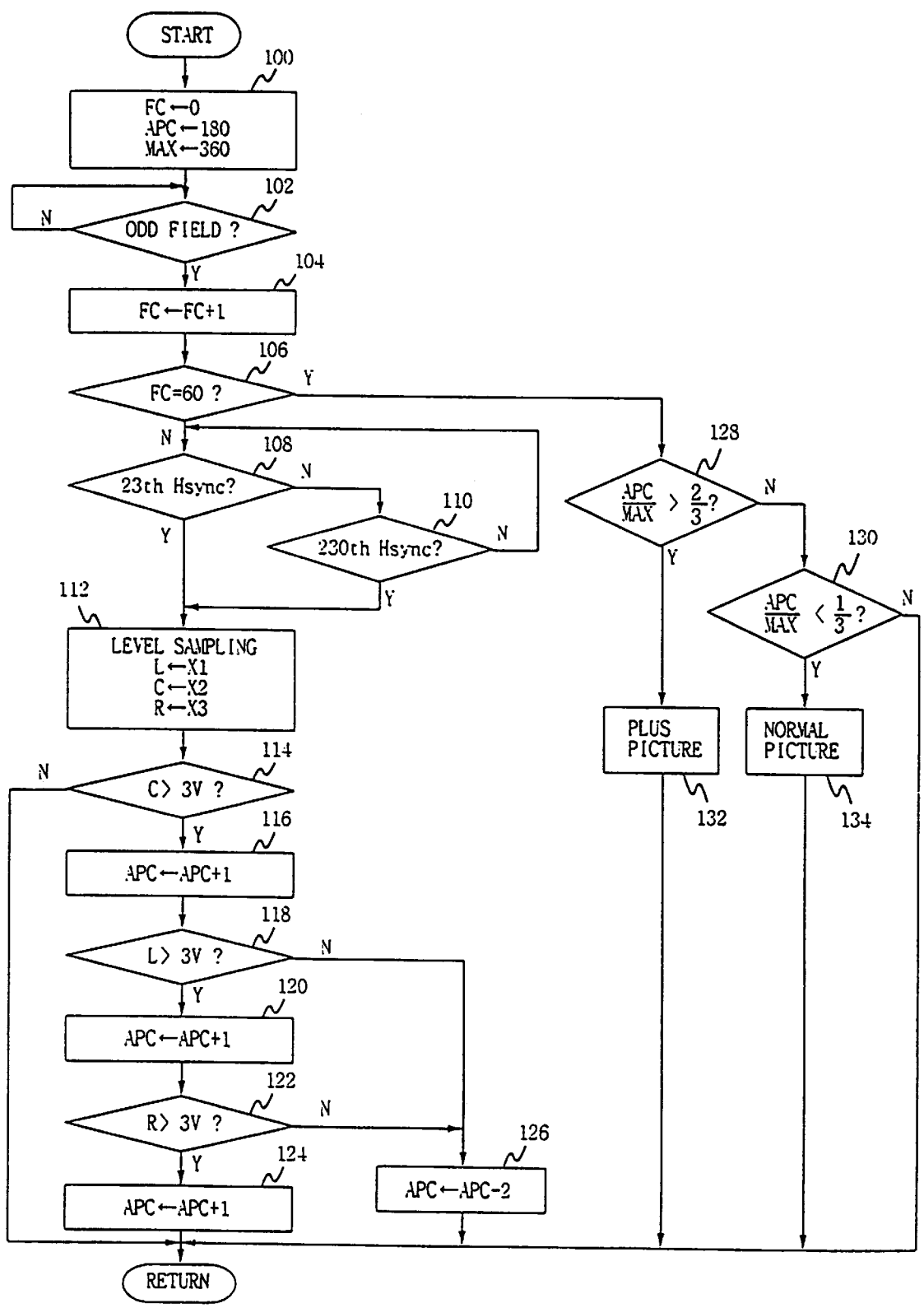
FIG. 7 is a flow chart explaining the automatic picture size control method according to the present invention.

Referring to FIG. 7, a preferred embodiment of the present invention will be explained.

First, when a channel is selected, the value APC of an auto plus counter is initialized to "180" which is ½ of the maximum value, and a picture size mode becomes a plus picture mode. And, the value FC of the frame counter is initialized to "0" (step 100). After such an initialization, a sync signal is separated from a received composite video signal, and it is checked if a current field is an odd field by discriminating the separated sync signal (step 102). If it is checked that the current field is the odd field, the counted value of the frame counter is increased by 1 (step 104). Thereafter, it is checked if the counted value of the frame counter becomes 60 (step 106), and if not, it is checked if the current horizontal scanning line is the 23rd line by counting the horizontal sync signal (step 108). Also, it is checked if the current horizontal scanning line is the 230th line (step 110). If it is checked that the current horizontal scanning line is the 23rd or 230th line at steps 108 and 110, the levels of C, L, and R in the active period of the respective horizontal scanning lines are sampled (step 112). Thereafter, it is checked whether or not the sampled value X2 of the center point C is more than 3V (step 114). If it is checked that the sampled value X2 is more than 3V, the counted value APC is increased by 1 (step 116), while if not, the step is returned. Also, it is checked whether or not the left level X1 of the active period is more than 3V (step 118), and if so, the counted value APC is increased by 1 (step 120). Also, it is checked whether or not the right value X3 of the active period is more than 3V (step 122), and if so, the counted value is increased by 1 and then the step is returned (step 124). Meanwhile, if it is checked that the left or right level is less than 3V, the counted value is decreased by 2 and then the step is returned (step 126).

If the number of frames becomes 60 at step 106 by repeating the above-described procedure, it is checked if the counted value of the auto plus counter is more than $\frac{2}{3}$ of the maximum value (step 128), and if so, the picture size is adjusted as the plus picture and then the step is returned (step 132). If it is checked that the counted value is less than $\frac{2}{3}$ of the maximum value at step 128, it is then checked if the counted value is less than $\frac{1}{3}$ of the maximum value (step 130). If the counted value is checked to be less than $\frac{1}{3}$ of the maximum value, the picture size is adjusted as the normal picture (step 134), while if not, the present picture size is maintained as it is.

Specifically, in the embodiment, if a level which is different from a desired level is detected with respect to at least 10 frames among 60 checked frames, the picture size is adjusted as the plus picture or the normal picture to adjust the picture size of the currently received video signal.

Next, the operation of the apparatus for detecting left and right boundaries of a picture according to the present invention will be explained.

Figure 8:
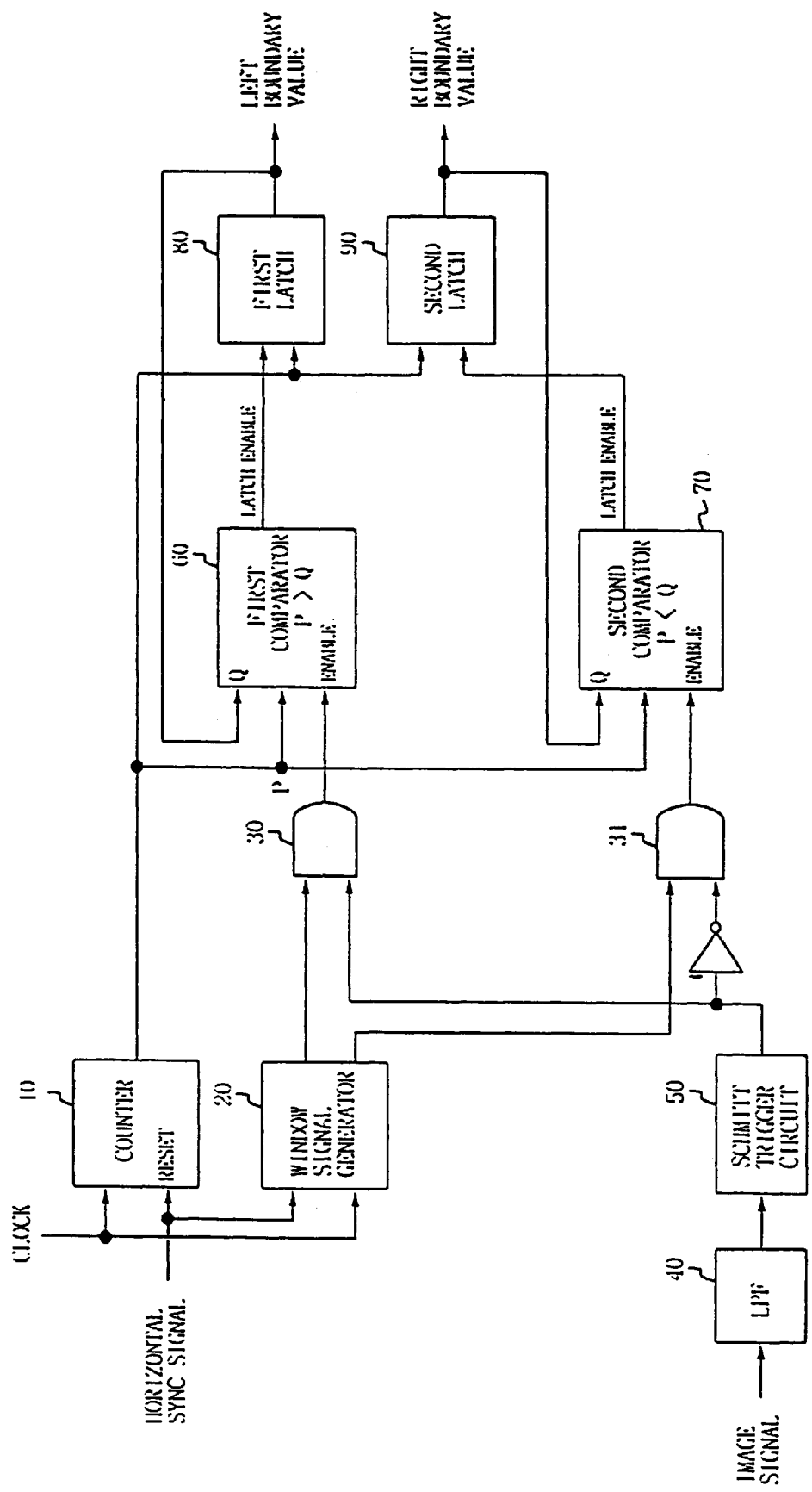
FIG. 8 is a block diagram of the apparatus for detecting left and right boundaries of the picture according to the present invention.

FIG. 8 is a block diagram of the apparatus for detecting left and right boundaries of a picture according to an embodiment of the present invention.

Referring to FIG. 8, the present apparatus includes a counter 10 which is reset by a horizontal sync signal of the image signal, and which receives a clock signal, a window signal generator 20 for receiving the horizontal sync signal and the clock signal, and generating a window signal for a predetermined period of the horizontal sync signal, a Schmitt trigger 50 for generating a trigger signal in accordance with the image signal, a first AND gate 30 for AND-gating the window signal from the window signal generator 20 and the trigger signal from the Schmitt trigger 50 to detect a left boundary of one horizontal scanning line, a second AND gate 31 for AND-gating the window signal from the window signal generator 20 and an inverted signal of the trigger signal from the Schmitt trigger 50 to detect a right boundary of the horizontal scanning line, a first comparator 60 for comparing the output of counter 10 with a value of a previous image to detect a left boundary of an entire picture, a second comparator 70 for comparing the output of counter 10 with the value of the previous image to detect a right boundary of the entire picture, a first latch 80 for storing an output value of the first comparator 60, outputting the boundary value stored therein to the first comparator 60 as the value of the previous image, and outputting the left boundary value of the entire picture, and a second latch 90 for storing an output value of the second comparator 70, outputting the boundary value stored therein to the second comparator 70 as the value of the previous image, and outputting the right boundary value of the entire picture.

FIGS. 9A, 9B, and 9C illustrate an input image signal, a window signal outputted from the window signal generator 20, and left and right boundary signals of one horizontal scanning line which are outputted from the AND gates 30 and 31, respectively.

Referring to FIG. 8, the counter 10 is reset by the horizontal sync signal and performs a counting operation in accordance with the input clock signal. The counted values signify values for determining the left boundary and the right boundary of the picture. The window signal generator 20 receives the horizontal sync signal and generates a window signal which has predetermined size and is apart for a predetermined period from the horizontal sync signal.

FIG. 9B illustrates the window signal generated from the window signal generator 20. As shown in FIG. 9B, two window signals having a predetermined size exist, being apart for a predetermined period from the horizontal sync signal. The position and size of each window signal are determined so that the window signal includes the left and right boundaries of all the horizontal scanning lines.

The input image signal is inputted to the Schmitt trigger 50 through a low-pass filter (LPF) 40 for reducing the noise of the image signal. The Schmitt trigger 50 generates a trigger signal if the input image signal exceeds a predetermined level. FIG. 9A illustrates an input image signal and the trigger level. According to the present invention, the image signal which exceeds the trigger level is determined as a significant image signal, and the point where the image signal becomes the trigger level is determined as a boundary for the respective horizontal scanning lines.

The first AND gate 30 AND-gates the window signal outputted from the window signal generator 30 and the trigger signal outputted from the Schmitt trigger 50. Specifically, if the input image signal is higher than the trigger level in the first window signal as shown in FIG. 9B, the first AND gate 30 outputs "1", while if not, it outputs "0"

The output of the first AND gate 30 is inputted to the first comparator 60 as its enable signal to enable the first comparator 60. The first comparator 60 compares the counted value P of the point with the counted value Q which represents the left boundary value of the previous horizontal scanning line, and outputs a latch-enable signal if P>Q as a result of comparison. For the case of the first horizontal scanning line of the image signal, there does not exist a counted value Q which represents the left boundary value of the previous scanning line, and thus the value Q is determined to be "0".

The first latch 80 stores the current counted value as that representing the left boundary in accordance with the latch-enable signal outputted from the first comparator 60.

Meanwhile, the second AND gate 31 AND-gates the window signal outputted from the window signal generator 20 and the inverted trigger signal from the Schmitt trigger 50. Specifically, if the input image signal is lower than the trigger level in the second window signal as shown in FIG. 9B, the second AND gate 31 outputs "1", while if not, it outputs "0".

The output of the second AND gate 31 is inputted to the second comparator 70 as its enable signal to enable the second comparator 70. The second comparator 70 compares the counted value P of the point with the counted value Q which represents the right boundary value of the previous scanning line, and outputs a latch-enable signal if P<Q as a result of comparison. In case of the first scanning line of the image signal, there does not exist a counted value Q which represents the left boundary value of the previous scanning line, and thus the value Q is determined to be the maximum counted value which can be outputted by the counter.

The second latch 90 stores the current counted value as that representing the right boundary in accordance with the latch-enable signal outputted from the second comparator 70.

As a result, the first AND gate 30 detects the left boundaries of the respective horizontal scanning lines, and the second AND gate 31 detects the right boundaries of the respective horizontal scanning lines. The boundary values detected in the respective horizontal scanning lines are compared with the boundary values detected in the previous horizontal scanning lines by the first comparator 60 and the second comparator 70, respectively, so that the counted values which represent the inmost boundaries are stored in the first latch 80 and the second latch 90.

FIGS. 10A to 10C illustrate left and right boundary signals detected in respective horizontal scanning lines. According to the present invention, the left and right boundary signals finally outputted will be the inmost boundary signals among the boundary signals detected in the respective horizontal scanning lines as shown in FIG. 10B.

Also, since the picture size is adjusted by detecting the level of edge portions of a received video signal, a full picture is automatically displayed on the screen, thereby providing convenience in use.

As described above, according to the present invention, optimum detection of left and right boundaries of the image signal can be achieved by determining the left and right boundaries of the respective horizonal scanning lines which constitute the entire picture and by detecting the inmost boundary values.

While the present invention has been described and illustrated herein with reference to the preferred embodiment thereof, it will be understood by those skilled in the art that various changes in form and details may be made therein without departing from the spirit and scope of the invention.

What is claimed is:

1. A method of controlling a picture size, comprising the steps of:

sampling levels of left and right edge portions in an active period of one horizontal scanning line of a received television signal;

detecting and incrementing a level counter, each time said sampled levels of left and right edge portions are above a predefined level for a predetermined time;

designating a size of a displayed picture as a plus picture size if said level counter value is larger than a predetermined first threshold value; and designating said size of displayed picture as a normal picture size if said counted value is smaller than a predetermined second threshold value.

2. The method as claimed in claim 1, wherein said sampling step includes the substep of sampling a level of a center portion in said active period.

3. The method as claimed in claim 1, wherein said sampling of said left and right edge portions in said active period is performed 1.5 $\mu$s after a left edge of said left edge portion, and 1.5 $\mu$s before a right edge of said right edge portion, respectively.

4. The method as claimed in claim 2, wherein the number of said sampled horizontal scanning lines is at least 2 per frame.

5. The method as claimed in claim 1, wherein said predetermined time corresponds to at least 60 frames.

6. The method as claimed in claim 1, wherein said first value is ⅔ of a maximum value which is determined by multiplication of the number of samples taken in said horizontal scanning line, the number of sampled horizontal scanning lines, and the number of checked frames.

7. The method as claimed in claim 1, wherein said second value is ⅓ of a maximum value which is determined by multiplication of the number of sampling in said horizontal scanning line, the number of sampled horizontal scanning lines, and the number of checked frames.

8. The method as claimed in claim 1, wherein said counted value is set to be ½ of a maximum value which is determined by multiplication of the number of samples in said horizontal scanning line, the number of sampled horizontal scanning lines, and the number of checked frames, at an initial stage.

9. The method as claimed in claim 1, wherein said sampled horizontal scanning lines are 23rd and 230th horizontal scanning lines of each frame.

10. The method as claimed in claim 1, wherein said detecting and counting step comprises the substeps of:

checking whether or not a center level in said active period is higher than a predetermined level;

increasing said counted value by 1 if it is checked that said center level is higher than said predetermined level;

checking whether or not a left level in said active period is higher than said predetermined level;

increasing said counted value by 1 if it is checked that said left level is higher than said predetermined level;

checking whether or not a right value in said active region is higher than said predetermined level;

increasing said counted value by 1 if it is checked that said right level is higher than said predetermined level; and decreasing said counted value by 2 if it is checked that said left or right level is lower than said predetermined level.

11. The method as claimed in claim 1, wherein said plus picture has a 12.8×9 aspect ratio (AR).

12. An apparatus for detecting left and right boundaries of a picture derived from a received image signal, the apparatus comprising:

a counter which is reset by a horizontal sync signal of said image signal, and which receives a clock signal to generate a count;

a window signal generator for receiving said horizontal sync signal and said clock signal, and generating a window signal for a predetermined period of said horizontal signal;

a trigger circuit for generating a trigger signal in accordance with said image signal;

a first AND gate for AND-gating said window signal from said window signal generator and said trigger signal from said trigger circuit to detect a left boundary of one horizontal scanning line;

a second AND gate for AND-gating said window signal from said window signal generator and an inverted signal of said trigger signal from said trigger circuit to detect a right boundary of said horizontal scanning line;

a first comparator for comparing said count with a left boundary value of a previous image, upon receiving an enable signal from said first AND gate, to detect a left boundary of an entire picture;

a second comparator for comparing said count, with a right boundary value of said previous image, upon receiving an enable signal from said second AND gate, to detect a right boundary of said entire picture;

a first latch for storing an output boundary value of said first comparator, outputting said boundary value stored therein to said first comparator as said value of said previous image, and receiving a latch enable from said first comparator so as to output said left boundary value of said entire picture when a current count exceeds said left boundary value of a previous image, whereby the output of said first latch represents an entire picture inmost left boundary among a plurality of left boundary values of said picture; and a second latch for storing an output value of said second comparator, outputting said boundary value stored therein to said second comparator as said value of said previous image, and receiving a latch enable from said second comparator so as to output said right boundary value of said entire picture if it is less than said right boundary value of a previous image, whereby the output of said second latch represents an entire picture inmost right boundary among a plurality of right boundary values of said picture.

13. The apparatus as claimed in claim 12, wherein said Schmitt trigger generates said trigger signal with respect to said image signal the level of which exceeds a predetermined trigger level, so that said image signal exceeding said predetermined trigger level is determined as a significant image signal, and the point where said significant image signal exists is determined as said boundary of said respective horizontal scanning lines.

14. The apparatus as claimed in claim 12, further comprising a low-pass filter for filtering said received image signal and inputting said filtered image signal to said Schmitt trigger to remove noise contained in said received image signal.

15. The apparatus of claim 12 wherein said trigger circuit comprises a Schmitt trigger.

16. The method as claimed in claim 1, wherein said predefined level corresponds to a black level threshold.

17. A method of controlling a picture size, comprising the steps of:

obtaining, for each of a predetermined plurality of frames, a maximum of three sampling levels of a received television signal, including sampling levels at a left edge portion and a right edge portion of the received television signal, during an active period of a horizontal scanning line;

generating a count value by comparing said sampling levels in said plurality of frames to a predefined level, said count value being based on how many of said sampling levels are above said predefined level;

designating a size of a displayed picture as a plus picture size if said count value is larger than a predetermined first value; and designating said size of said displayed picture as a normal picture size if said count value is smaller than a predetermined second value.

18. The method as claimed in claim 17 wherein, in said obtaining step, three sampling levels are taken, said three sampling levels consisting of one sample at said left edge portion, one sample at said right edge portion and one sample at a center portion of said received signal during said active period.

19. The method as claimed in claim 17, wherein said generating step includes setting said count value at an initial value and incrementing said count value for each newly detected sampling level above said predefined threshold and decreasing said count value for each newly detected sampling level below said predefined threshold.

20. The method as claimed in claim 17, wherein said predefined level corresponds to a black level threshold.

* * * * *